United States Patent
Bagarelli et al.

(10) Patent No.: US 8,400,798 B2
(45) Date of Patent: Mar. 19, 2013

(54) PREDICTIVE CURRENT CONTROL IN DRIVING A LOAD IN A PWM MODE

(75) Inventors: Fulvio Giacomo Bagarelli, Cremona (IT); Vincenzo Marano, Muggiò (IT)

(73) Assignee: STMicroelectronics S. R. L., Agrate Brianza (MB) (IT)

(*) Notice: Subject to any disclaimer, the term of this patent is extended or adjusted under 35 U.S.C. 154(b) by 632 days.

(21) Appl. No.: 12/638,711

(22) Filed: Dec. 15, 2009

(65) Prior Publication Data

US 2010/0157635 A1    Jun. 24, 2010

(30) Foreign Application Priority Data

Dec. 18, 2008  (IT) .......................... VA2008A000063

(51) Int. Cl.
*H02M 5/42* (2006.01)
*H02M 7/68* (2006.01)
*H02M 3/24* (2006.01)
*H02M 7/44* (2006.01)
*H02M 7/5387* (2007.01)

(52) U.S. Cl. .......................... 363/98; 363/132
(58) Field of Classification Search .......... 363/98, 363/132
See application file for complete search history.

(56) References Cited

U.S. PATENT DOCUMENTS

| | | | | |
|---|---|---|---|---|
| 5,708,578 A | * | 1/1998 | Stoddard et al. | 363/98 |
| 5,912,813 A | * | 6/1999 | Kerkman et al. | 363/98 |
| 6,119,046 A | * | 9/2000 | Sporer | 363/63 |
| 2005/0168198 A1 | | 8/2005 | Maksimovic et al. | 323/222 |
| 2008/0036430 A1 | | 2/2008 | Li et al. | 323/222 |

FOREIGN PATENT DOCUMENTS

EP    1503492    2/2005

OTHER PUBLICATIONS

Heinrichs, "TLE 472x—Stepper Motor Drivers; Current Control Method and Accuracy", Infineon Technologies, Aug. 2001, pp. 1-4.
Athalye et al., "DSP implementation of a single-cycle predictive current controller in a boost PFC rectifier", IEEE, Jan. 2005, pp. 837-842.
Chen et al., "Predictive digital current programmed control", IEEE Transactions on Power Electronics, vol. 18, No. 1, Jan. 2003, pp. 411-419.

* cited by examiner

*Primary Examiner* — Jue Zhang
(74) *Attorney, Agent, or Firm* — Allen, Dyer, Doppelt, Millbrath & Gilchrist, P.A. Attorney at Law (57) ABSTRACT

A pulse width modulated current control method and system architecture may achieve the high performance of an advanced current control for full-bridge stages, in terms of accuracy, error, speed, and frequency response, but with a reduced complexity in terms of used analog circuits, being comparable with that of an elementary peak current control. The only analog blocks used may be a current sense transducer, i.e. a series resistor or a sense-FET, and a comparator for the current sensing while the rest of the control circuitry is digital.

25 Claims, 9 Drawing Sheets

APPLICATION EXAMPLE: FULL BRIDGE MOTOR DRIVE

FIG. 14

PREDICTIVE CURRENT CONTROL IN DRIVING A LOAD IN A PWM MODE

FIELD OF THE INVENTION

The present invention relates in general to switching mode driving of electrical loads, and, in particular, to driving of inductive loads through an output power stage.

BACKGROUND OF THE INVENTION

In typical current control systems using the technique of peak control, a current sensing transducer is used to sense the current in the output power bridge, and an analog comparator compares the sensed voltage with a reference voltage related to the desired current for the load. This system is just able to assess whether the current is above or below a certain threshold. In a power bridge, the sensing element is a resistor coupled in series between the low side switches and ground. In this application, the current information may not always be available. In fact, it may depend on the conditions of current recirculation.

Figure 1:
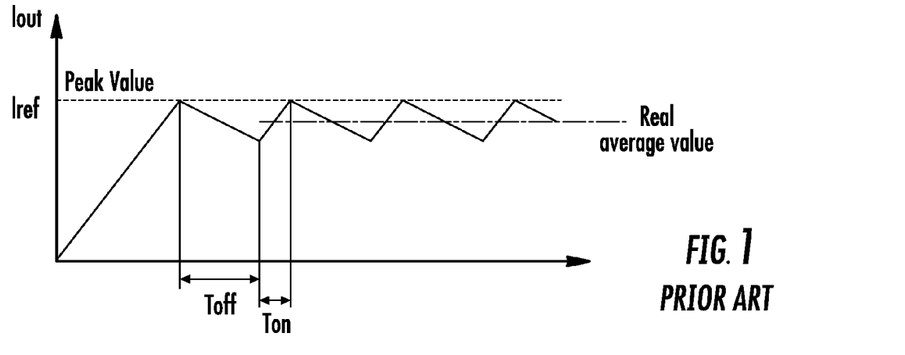
FIG. 1 is a diagram illustrating a peak current control, according to the prior art.

Typically, a peak current control system lets the load current increase until it reaches a set threshold and then turns off the power stage. The current decays for a time that depends on the type of control that is implemented: Toff-constant or constant pulse width modulated (PWM) frequency, as typical examples. In FIG. 1, a Toff-constant mode is shown.

The advantage of this approach is the simplicity of the circuitry for implementation. A disadvantage is that the system is affected by systematic error caused by changes of the current ripple. These changes in the current ripple notably increase with the absolute value of the current and are proportionally tied to the PWM period. The publication "Predictive Digital Current Programmed Control," Jingquan Chen, et al., January 2003, Power Electronics, IEEE Transactions, Vol. 18, Issue 1, Part 2, Pages 411-419 discloses a predictive digital current control for "valley," "peak," or "average current" in basic converters topologies: buck, boost, and buck-boost. The publication reveals that for each parameter of interest, there is a choice of the most appropriate PWM for accomplishing a predictive digital current control that avoids oscillation problems. The optimal duty cycle is computed by the controller, on the basis of a number of electrical parameters, such as load current, input voltage, output voltage and inductance value, implying multiplications, and divisions.

SUMMARY OF THE INVENTION

An object is to provide an efficient and effective method of controlling the load current in the presence of a significant and variable ripple.

The current control method and architecture being disclosed herein maintain the basic principle of a current peak control, thus using an analog circuit part including a sense element and a sense comparator, but effects a predictive control that is carried out with simple time measurements and algebraic additions implemented with relatively simple digital circuitry.

The method of this disclosure comprises measuring the time interval from the initial instant of an active ON-state of the power stage of an ON-phase to the instant the load current reaches the reference current value as determined by a valid switching of the sense comparator. So, when the sensed current is below the reference threshold at the beginning of the ON phase, and, differently from the typical techniques that switch off the power stage, continuing the ON-phase by maintaining in a ON-state the power stage for an additional time interval equal to an average between the just measured active ON-state interval and the active ON-state interval measured during a past PWM cycle. The past PWM cycle may be the cycle immediately preceding the current cycle or a more remote past cycle, for example, distant 3 to 10 or more cycles from the current cycle, or even an ON-state interval value that is averaged over a number of preceding cycles. The choice of the second term of the average may be fixed or programmable, depending on characteristics of the application, and even adaptively set in function of load conditions.

Thereafter, the power stage is switched off for a fixed interval time, as done in a Toff constant control method. During such a predictive ON-state, a sort of "blind" driving is performed because the load current has surpassed the reference threshold and the comparator has already triggered. During this protracted drive interval, the comparator output is ignored as during the following OFF-phase of the PWM cycle.

The control system produces a fast convergence of the average load current towards the set reference threshold value that triggers the comparator, thereby improving the accuracy of the control system. Further, the average value of a triangular wave as the ripple coincides with the mid points of each of its segments and, at steady state, the system tends to equalize the duration of the active Ton time and the predictive Ton_pred time.

Initializing implementation of a blanking time to prevent spurious switching and a current check at turn-on further enhances performance. Moreover, procedures of simple implementation for changing the set reference threshold and for achieving a quasi-constant PWM frequency may expand flexibility and utility of the control system for a broad range of applications. According to another embodiment, an adaptive current decay mode selection during the Toff phase of the PWM cycle may be implemented in a simplified manner for further improving performance.

DETAILED DESCRIPTION OF THE PREFERRED EMBODIMENTS

Figure 2:
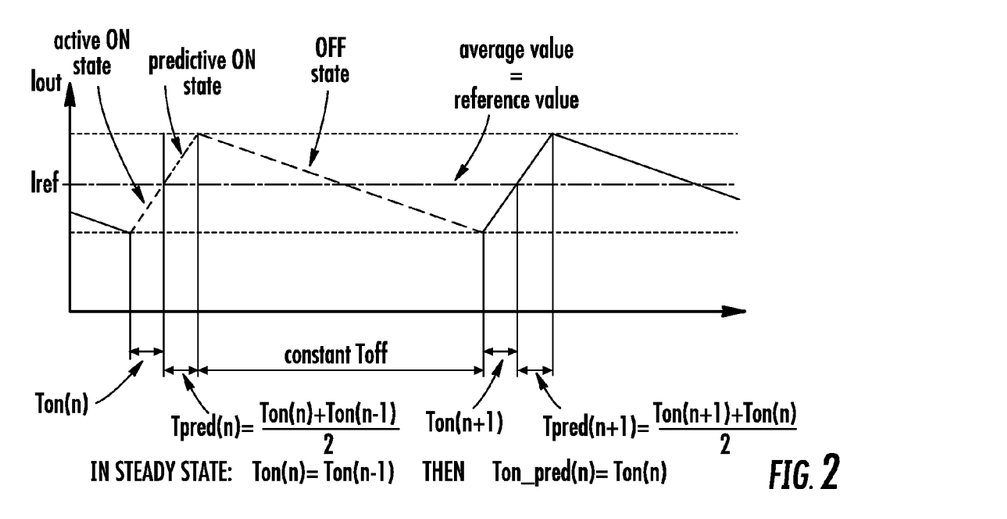
FIG. 2 is a diagram illustrating a basic predictive current control, according to the present invention.

FIG. 2 shows the temporal quantities that are utilized by the basic algorithm of the current control method of this disclosure. The current control method exploits the calculation power of digital electronics for real time measuring of the time interval Ton(n) from the initial instant of an active ON-state of the power stage of an ON-phase, to the instant the load current reaches the reference current value as determined by a valid switching of the sense comparator. Differently from a typical peak current control method, instead of switching off the power stage when the sense comparator triggers, the power stage is left to continue in the ON-phase, by maintaining it in a "predictive ON-state" for a further time interval Tpred(n) equal to the average between the just measured active ON-state interval Ton(n) and the active ON-state interval Ton(n−1) measured during the precedent PWM cycle. For sake of simplicity, in the following analysis and in the figures, it is assumed that the past PWM cycle be the last one (n−1) before the current cycle (n), however as already the second term for the averaging may be any other appropriate value related to a more remote past PWM cycle or even a "short-range" average value over several past PWM cycles. Thereafter, the power stage is switched off for a fixed interval time Toff, as done in a constant Toff control mode.

During such a predictive ON-state, a sort of "blind" driving is performed because the load current has surpassed the reference threshold and the comparator has already triggered. During this protracted drive interval, the comparator output state is ignored as during the following OFF-phase of the PWM cycle. The predictive algorithm of the current control method provides a fast and safe convergence to the reference value. In mathematical terms, it can be demonstrated as shown below.

Figure 3:
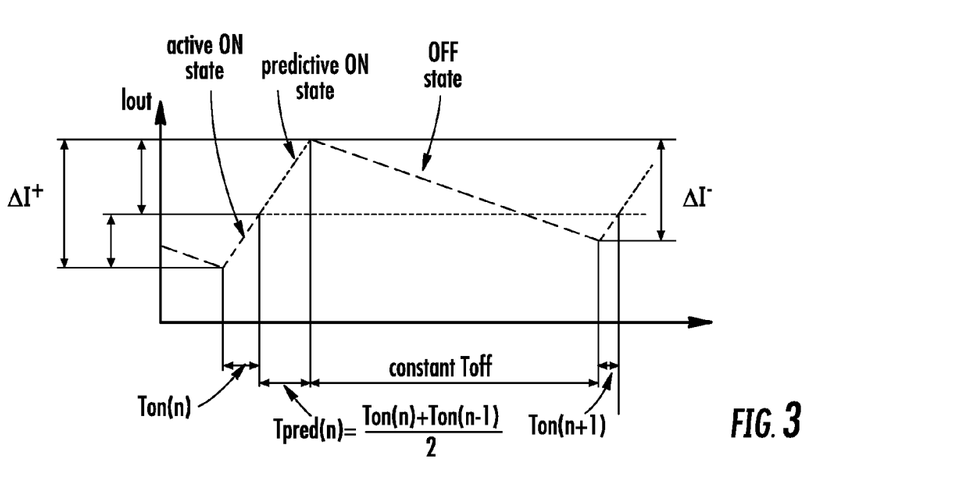
FIG. 3 is a diagram illustrating phase convergence of the current control toward steady state condition, according to the present invention.

For the system to converge in steady state, as depicted in FIG. 3, it may be:

$$\Delta I^+ = \Delta I^- \quad \text{Equation 1}$$

where:

$$\Delta I^+ = \left(\frac{dI_{ON}}{dt}\right) \cdot (T_{ON} + T_{PRED}) = K_{ON} \cdot (T_{ON} + T_{PRED}) \quad \text{Equation 2}$$

$$\Delta I^- = \left(\frac{dI_{OFF}}{dt}\right) \cdot T_{OFF} = K_{OFF} \cdot T_{OFF}.$$

In PWM control, the dI/dt can be considered substantially constant during a single PWM cycle, therefore:

$$\Delta I^+ = K_{ON} \cdot (T_{ON} + T_{PRED})$$

$$\Delta I^- = K_{OFF} \cdot T_{OFF} \quad \text{Equation 3}$$

and;

$$\Delta I_{ON} = K_{ON} \cdot T_{ON}$$

$$\Delta I_{PRED} = K_{ON} \cdot T_{PRED}$$

$$\Delta I_{OFF} = K_{OFF} \cdot T_{OFF}. \quad \text{Equation 4}$$

As observed in FIG. 3, the relationship between the current variation during the ON time at a certain point and the variation during the previous predictive and OFF times is the following:

$$\Delta I_{ON}(n+1) = \Delta I_{OFF} - \Delta I_{PRED}(n) \quad \text{Equation 5}$$

$$= \Delta I_{OFF} - \frac{K_{ON}}{2} \cdot (T_{ON}(n) + T_{ON}(n-1)).$$

This can be rewritten as the following numeric recursive succession describing how the ON time varies at each PWM cycle:

$$T_{ON}(n+1) = \frac{K_{OFF}}{K_{ON}} \cdot T_{OFF} - \frac{T_{ON}(n) + T_{ON}(n-1)}{2}. \quad \text{Equation 6}$$

Where $\frac{K_{OFF}}{K_{ON}} \cdot T_{OFF}$ is a constant that depends from the dI/dt and the OFF time set by the control system.

This is a typical recursive numeric succession (c being a constant) that has the following convergence value:

$$a(n+1) = c - a(n) - a(n-1) \longrightarrow \lim_{n \to \infty} a(n) = \frac{c}{2}. \quad \text{Equation 7}$$

Therefore, the system converges to the final value:

$$T_{ON}(n) = T_{ON}(n-1) = \frac{1}{2} \cdot \left(\frac{K_{OFF}}{K_{ON}}\right) \cdot T_{OFF}. \quad \text{Equation 8}$$

In the embodiment described above, the current control system is of the type denominated Toff-constant type PWM control, though different types of control may be alternatively implemented, as may be illustrated in the ensuing description.

Figure 4:
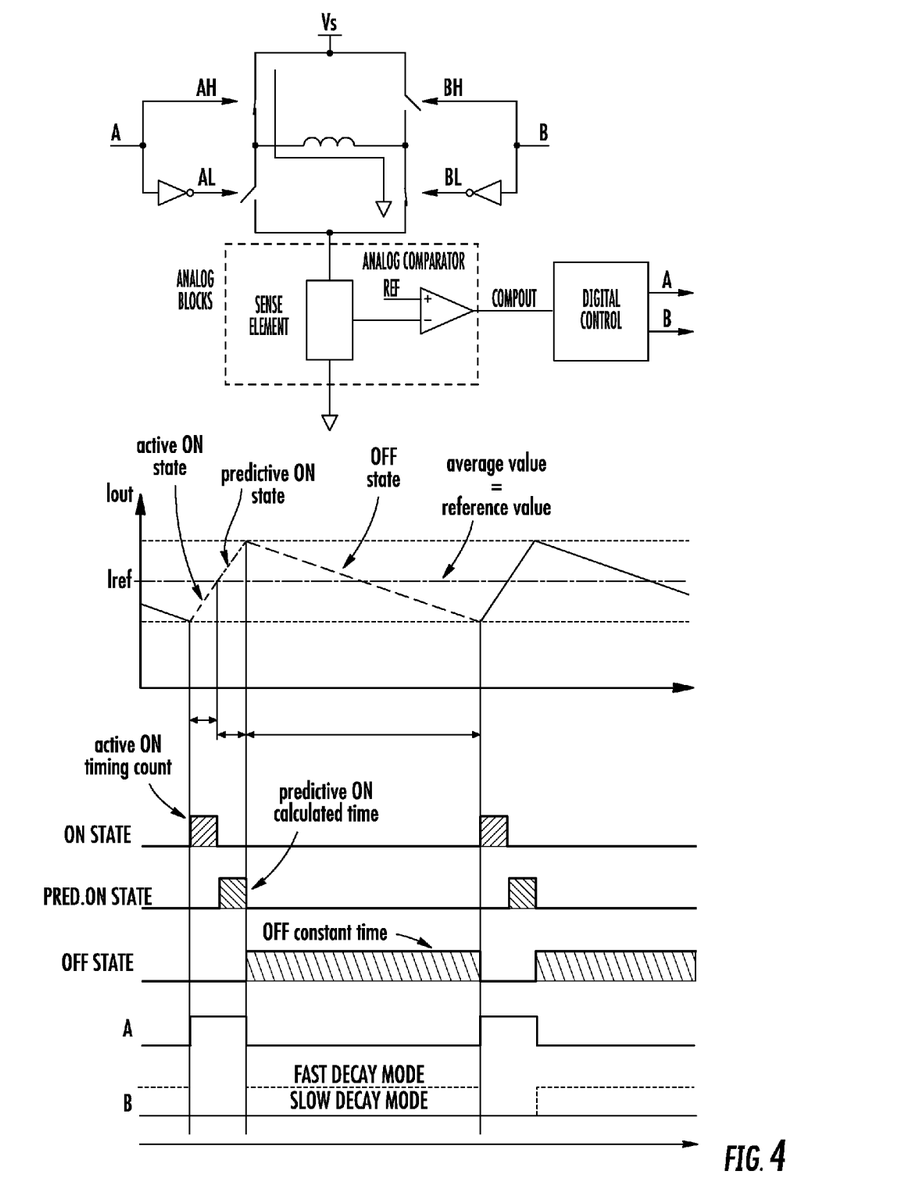
FIG. 4 shows a circuit diagram and related signal waveforms of an embodiment of the predictive current control, according to the present invention.

FIG. 4 shows an exemplary circuit embodying the current control system and the relevant signal waveforms of the state machine represented by the block digital control of the circuit diagram. A full-bridge controls in both directions the current in an inductive load. The analog part analog block of the control system includes a sense element that may even be a simple resistor or a sense field effect transistor (FET), and an analog comparator, or any equivalent device able to compare the current in the load with a given reference.

A first remark is that the current control system of this disclosure, according to a basic embodiment, doesn't use sense the current in the load when the full-bridge is in OFF-state, because the digital controller works only on feedback information produced during the ON-state of the output power stage. According to the basic embodiment, the sense resistor would not be used to produce information on the load current when the current is decaying (e.g. eventually in slow or fast mode).

Therefore, the analog comparator merely provides a comparison signal of the current delivered to the load with a given reference threshold. The output of the comparator is fed into the control logic of the system, digital control, which outputs the driving signals to the power switches of the full-bridge.

Figure 5:
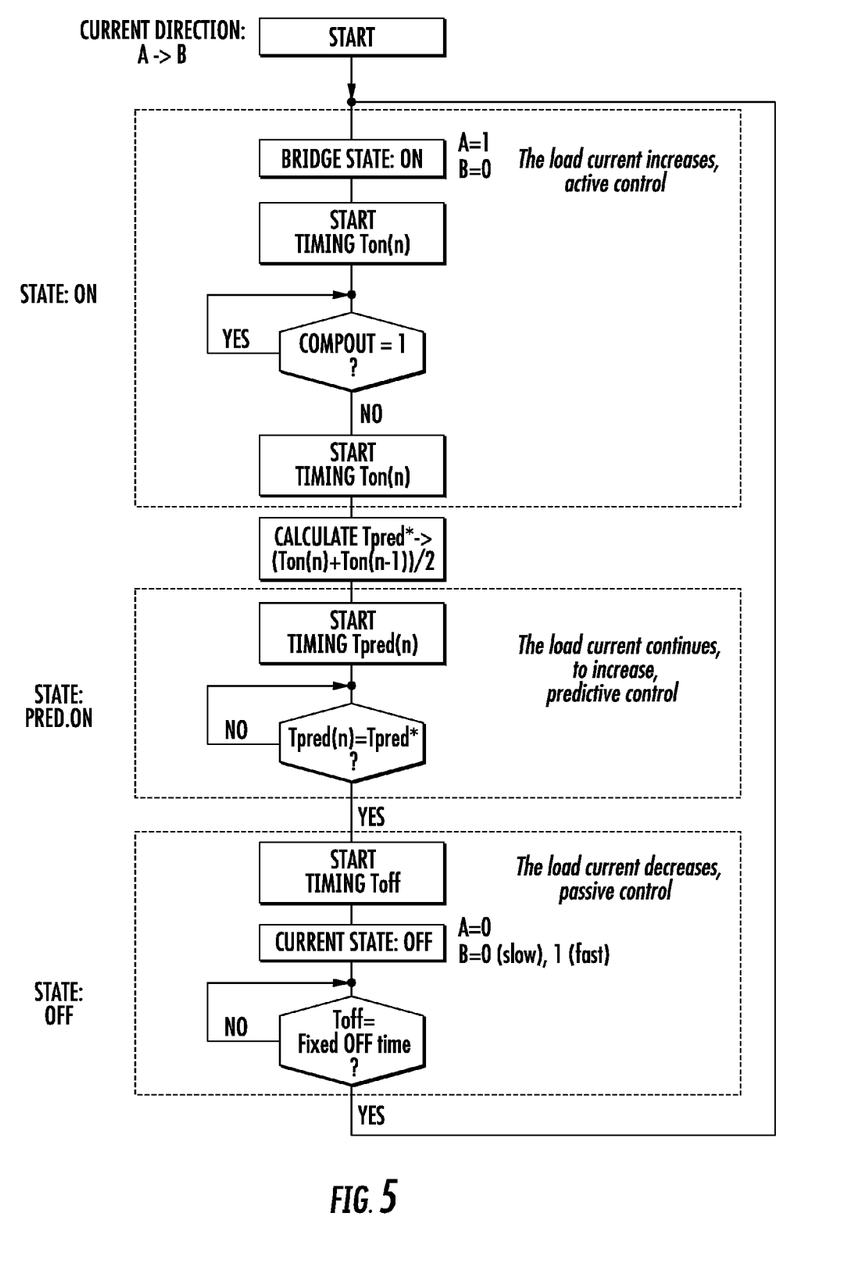
FIG. 5 is a flow chart of a basic embodiment of the predictive current control, according to the present invention.

FIG. 5 is a flow chart of the basic predictive current control method. The flow chart describes the working principle of the state machine, which is the core of the predictive current control method. According to the circuit diagram and related waveforms of FIG. 4, the flow chart illustrates that the only input variable to the state machine is the output of the sense comparator, which is only able to signal whether the current is above or below the reference value, when the power bridge is in ON-state. Both the phases of predictive ON-state and of OFF-state are completely blind as far as input of the control system is concerned.

According to an embodiment, a more advanced control may be implemented to prevent possible perturbations and/or to improve performance when far from steady state or on account of non-idealities of the electrical components used. A flow chart of an exemplary embodiment of a more advanced control is shown in FIG. 6.

Initialization

Figure 6:
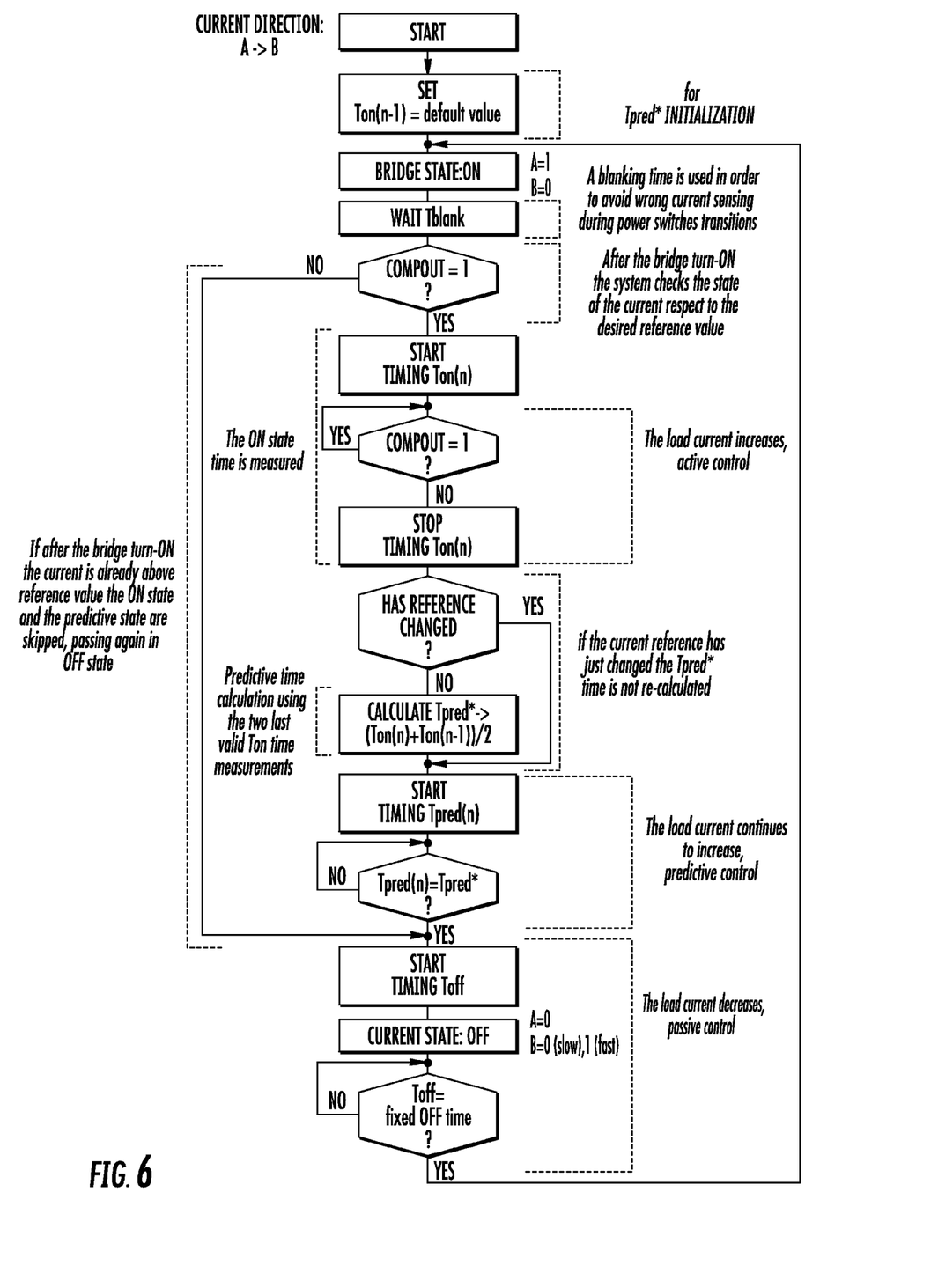
FIG. 6 is a flow chart for another embodiment of the predictive current control, according to the present invention.
Figure 7:
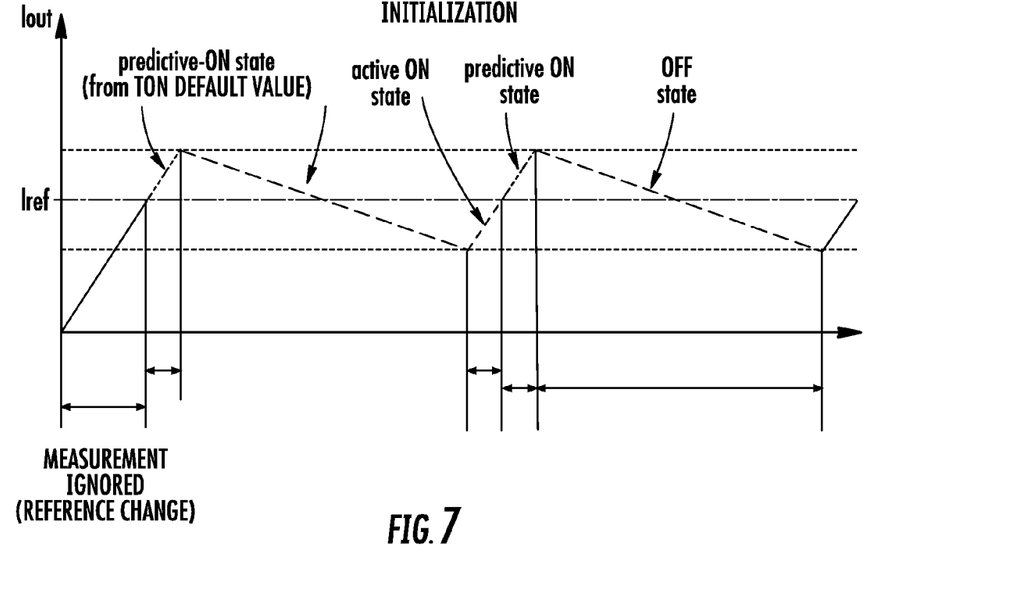
FIG. 7 is a diagram illustrating the initialization of the control system at turn-on of the output power stage, according to the present invention.

The flow chart of FIG. 6 contemplates initialization with a default value of the Ton register registers that may thereafter be updated to contain the ON-state time measurement of the last PWM cycle, and at start up, is used as predictive Ton time to speed up the convergence process, as illustrated in FIG. 7.

Blanking Time Mask

At every power bridge switching to an ON-state (turn-ON), a blanking time mask should be introduced in order to avoid spurious triggering of the sense comparator because of spikes or perturbations caused power switch transitions. After this blanking time is elapsed, the power switches can be considered completely turned ON, and hence, the output of the comparator is considered valid. If a relatively long blanking time is implemented for robustness purposes, it is possible to consider this blanking time as the initial value of the Ton time counter, for compensating any error in the ON-time measurement and therefore in converging to the reference current value.

Current Check at Turn-ONs

Upon elapsing of a blanking time, the output compout of the sense comparator is made visible to the digital control circuitry that checks if the current is above or below the reference threshold. If the current is found above the threshold, it means that the current has increased too much during the blanked ON-state and this could happen because of different reasons. For example, during the preceding OFF-phase, the current has decayed insufficiently or the current reference has been reduced.

In this case, immediately after the blanking time, the control system set the power stage in OFF-state in order to allow current to decrease further down toward the reference value, skipping completely the ON-phase of the PWM cycle, i.e. the active ON-state and the ensuing predictive-ON state.

By contrast, if after the blanking time the current is found to be below the reference threshold, the system follows the normal routine, setting the power bridge in ON-state, measuring the Ton interval and after it calculates Tpred, continuing to deliver current to the load for the calculated predictive ON-state Tpred interval. The PWM OFF-phase may follow the predictive ON-state, for a certain constant duration Toff, and after the control system may again turn the power bridge ON and wait for the elapsing of the constant blanking time. The Toff time and the blanking time are constant values set by the user and usually may depend from the application features.

Figure 8:
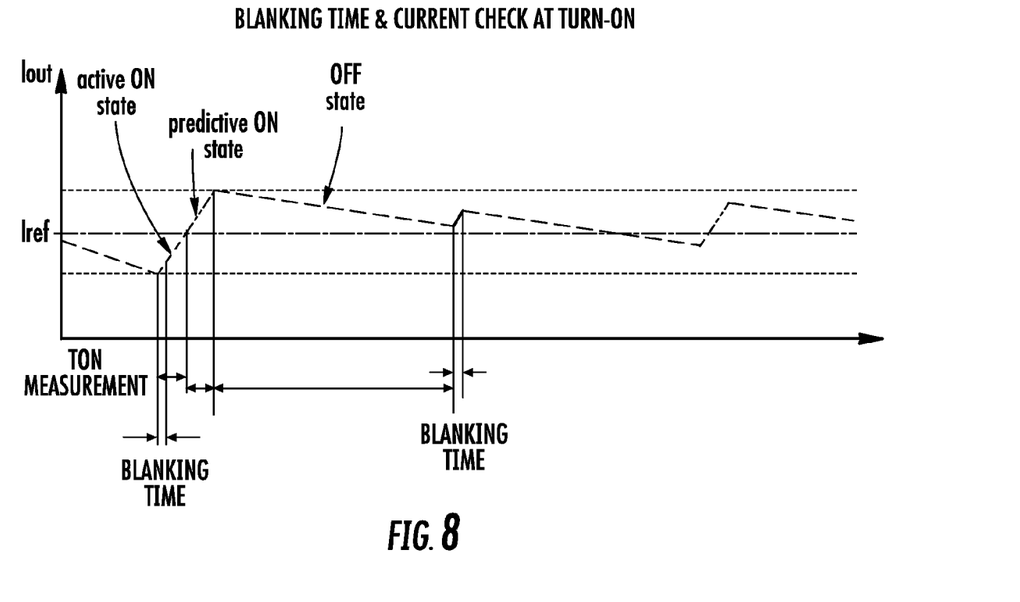
FIG. 8 is a diagram illustrating the introduction of a blanking time interval and of a current check at turn-on of the power stage, according to the present invention.

It should be remarked that the flow charts of FIG. 5 and FIG. 6 should be considered exemplary as far as basic illustrations of embodiments of the method of this disclosure, indeed, the sequence of instructions and the relative positions of some of the controls that are implemented may be different, what really is important is the result of such state machine operations. FIG. 8 is a time diagram illustrating how a current control system is provided with blanking time and turn-on current check functions rapidly converges to the reference current value (in the sense of rapidly reaching steady state).

Change of the Reference Value

When the control logic changes the current reference value, the Ton time measurement performed during the ON-state is ignored until the next valid switching of the sense comparator and the predictive Ton time retains the last validly calculated value. This avoids Ton time measurements much longer than the real Ton steady state value, which may happen soon after the reference value change.

Figure 9:
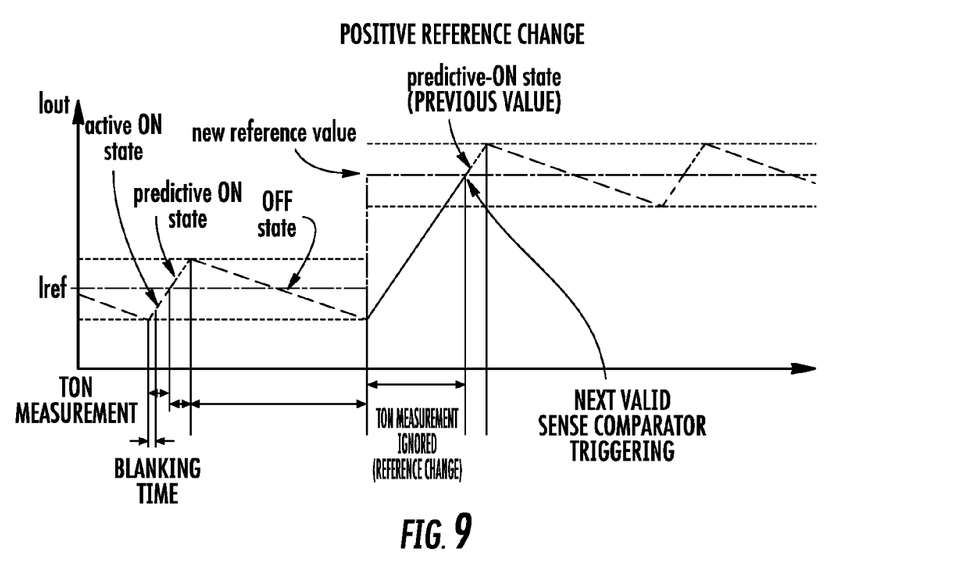
FIG. 9 is a diagram illustrating an event of change of a set current reference value (incrementing adjustment), according to the present invention.
Figure 10:
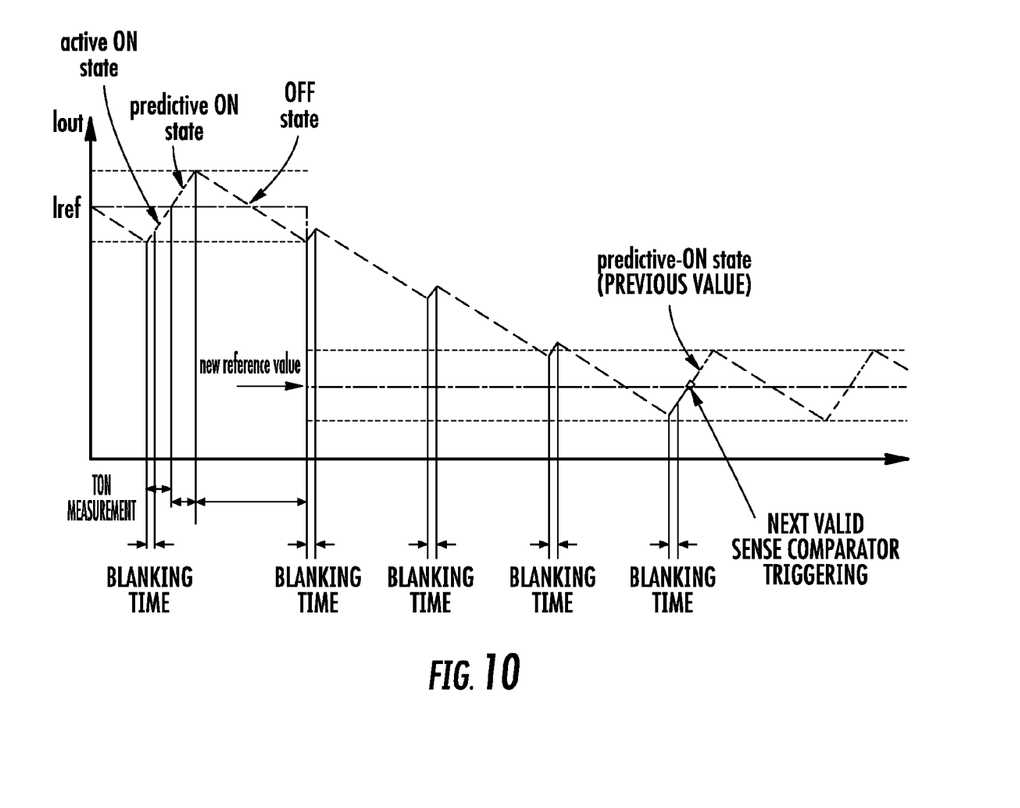
FIG. 10 is a diagram illustrating an event of change of a set current reference value (decrementing adjustment), according to the present invention.

Neglecting the Ton time measurement immediately after a variation of the current reference value avoids perturbations in the predictive current control loop and reduces the time used to converge to the new desired steady state. As illustrated in the flow chart of FIG. 6 and in the diagrams of FIG. 9, for the case of a decrementing adjustment of the reference value, and of FIG. 10, for the case of an incrementing adjustment of the reference value, just after a current reference change, the last value of the predictive Ton time is retained unchanged until the next valid sense comparator triggering.

It may be observed that, in case of a decrementing change of the reference value, the sensed current may be above the new current reference, however, in this case, the blanking time routine sets the control system immediately back to OFF state for a further Toff time and the Ton time measurement is ignored. In any case, a sense comparator triggering is considered valid for starting the predictive ON-state only when the sensed current is below the reference threshold at the beginning of the ON phase.

Quasi Constant PWM Frequency

As explained above, after few cycles an embodiment of the system of this disclosure reaches steady state condition and the resulting Ton may be given by the following equation:

$$T_{ON}(n) = T_{ON}(n-1) = \frac{1}{2} \cdot \left(\frac{K_{OFF}}{K_{ON}}\right) \cdot T_{OFF},$$

where Toff may be a constant time defined by the user.

In order to converge properly, Toff should remain constant in approaching the convergence value, as far as the reference value is fixed or practically so. However, when the reference value changes, it is possible to modify also Toff, in view of the fact that in any case the system would be perturbed. Because the predictive ON-state is based on the measurement of Ton during a past PWM cycle and the reference value adjustments are normally relatively small in absolute value, it is worthwhile to avoid large variations of the Toff parameter, considering that Toff is strictly related to the switching frequency of the PWM control, which, once fixed the current reference, depends only by Toff, as per the following equation:

$$f_{SW} = \frac{1}{T_{ON} + T_{PRED} + T_{OFF}}$$
$$= \frac{1}{2 \cdot T_{ON} + T_{OFF}}$$
$$= \frac{1}{\frac{K_{OFF}}{K_{ON}} \cdot T_{OFF} + T_{OFF}}$$
$$= \frac{1}{\left(\frac{K_{OFF}}{K_{ON}} + 1\right) \cdot T_{OFF}}$$
$$= \frac{K_{ON}}{K_{OFF} + K_{ON}} \cdot \frac{1}{T_{OFF}}.$$

Because after a small current reference variation, the convergence value of Ton would be quite close to the previously measured Ton value, the time Toff could be advantageously selected (one time only after a reference value change) by the following approximately determined value:

$$T_{OFF} = \frac{1}{f_{SW}} - T_{ON}(n),$$

where Ton(n) is the last valid measurement of the duration of the ON-state, with the previous current reference value.

In this way, the real switching frequency may remain very close to the design value and the current control, differently from a typical peak current control, can be considered as a quasi-constant PWM frequency control system.

Adaptive Current Decay Selection

Figure 11:
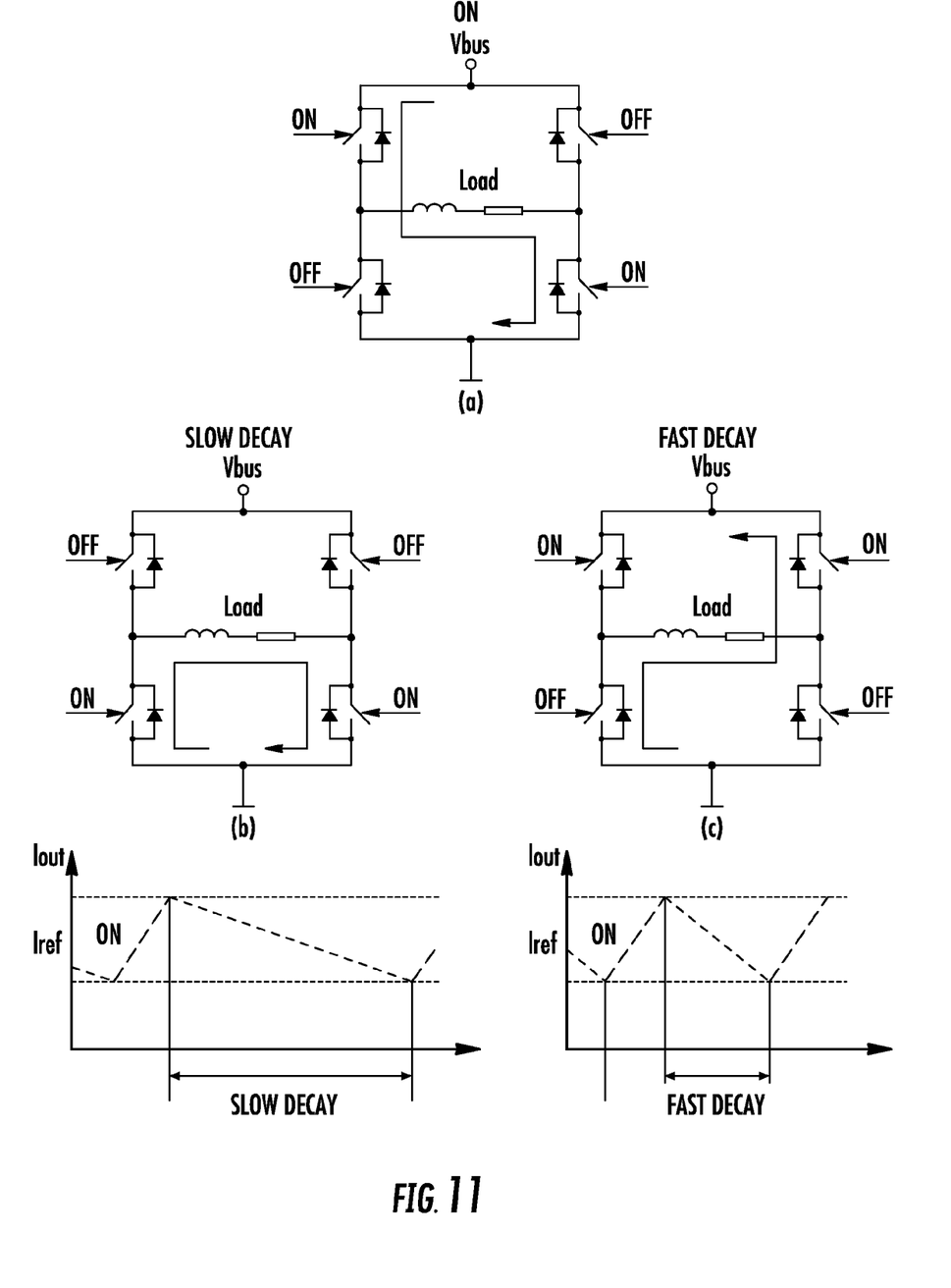
FIG. 11 illustrates schemes of slow decay mode and fast decay mode of the load current during an off-phase of PWM driving, according to the present invention.

The slope of load current decay during OFF-phases of PWM driving may be selected from different decay modes, generally between a slow decay and a fast decay. In FIG. 11, two different decay modes are shown for the case of a full-bridge power stage. The same definitions apply to other power stage topologies, for example, a 3-phase bridge and others.

A slow decay is implemented when the load is short-circuited, voltage drop on the load is minimized. and the current discharges on passive components. A fast decay is implemented when the current in the load flows through the switches towards the supply nodes, and the voltage drop on the load approximates the supply voltage.

The definition slow and fast decay refers to the different current slopes as shown in the following relationships:

$$\frac{\Delta I_{SLOW}}{\Delta T} = \frac{V_{DS\_switch} + V_{DIODE}}{L_{LOAD}}$$
$$\frac{\Delta I_{FAST}}{\Delta T} = \frac{V_{BUS} + 2 \cdot V_{DIODE}}{L_{LOAD}}.$$

In some approaches, the decay mode is fixed and can be selected by the external user/controller depending on the performance of the control system. Normally, the slow decay is the most often used mode because it provides lower PWM frequencies (and therefore lower power dissipation at switching) in fixed off-time control systems, or lower current ripple in fixed PWM frequency control systems. But there are also other different approaches, which make use of a mixed approach to the current decay, known as mixed decay. A known controller of this kind is the Allegro 3977° C. It uses a mixed decay mode with fixed off-time in its PWM current regulators, which limits the peak current in the load to a reference threshold. Initially, a diagonal pair of the power bridge is enabled and current flows through the inductive load as shown in FIG. 11 (a). When the load current reaches the desired value, a current-sense comparator resets the PWM latch, which turns off both the high side and the low side switch in order to obtain mixed decay mode, and the current recirculates as shown in FIGS. 11(b) and (c). During this recirculation, the current decreases until the fixed off time expires.

Mixed decay splits the fixed off-time of the PWM cycle into fast and then slow decay. After the fixed off-time of the PWM cycle, the appropriate switches are enabled again, the inductive load current increases and the PWM cycle is repeated. Using mixed decay with fixed off time has the advantage that PWM frequency is variable (lower peak in EMC spectrum, because energy in spectrum is smeared), but it needs a relatively high frequency to guarantee operation above 20 kHz and this generates additional heat-losses.

Other known controllers of this kind are available in Infineon TLE-472x series ICs, and in Toshiba TB62200. The latter uses fixed frequency PWM with slow, fast, and mixed decay. In mixed decay mode, additional switching points are used, which entail increased complexity.

All drive systems working in slow decay mode have the problem of the minimum ON-phase time that can be handled. In fact, in a typical power application using PWM current control, it is impossible to accomplish a zero percent duty cycle. The reason being power bridge delays that limit the minimum ON-phase time to a certain value. In some conditions, the slow decay mode is unable to guarantee proper current regulation, because the OFF-phase time is no longer sufficient to decay the current down to a proper value, and consequently, the ON-phase time should become shorter that the viable minimum.

In practice, a typical condition in which the system tends toward very low duty cycles is when the set reference current value is very low. The situation could be even more critical if the supply voltage of the power bridge is relatively low and the load inductance and resistance are high, which means that the current slopes are also significantly slow.

Considering the power bridge of FIG. 11, in first approximation, once a preferred reference current value is reached, the effective duty cycle applied to the load is:

$$D \cong \frac{V_{LOAD}}{V_{SUPPLY}} = \frac{I_{LOAD} \cdot R_{LOAD}}{V_{SUPPLY}}.$$

The lower the average load current is, the lower may be the effective duty cycle and therefore the ON-phase duration. This holds whether the PWM control is a fixed OFF-time or a fixed frequency one.

When the ON-time duration reaches the viable minimum value, in order to prevent impairing of performance, the system should switch to a fast decay mode for making faster the decay of the current and greater the duty cycle.

An effective current decay architecture, thought to be eventually introduced in a current control system of this disclosure to further enhance its flexibility of application to a broad spectrum of systems, provides for an intelligent (adaptive) selection of the current decay mode, either slow or fast, depending on the current condition in the load for better adapting the driving to every condition of operation.

Similar for the current control algorithm of this disclosure, the ancillary adaptive current decay mode selection is based on the measurement of the ON-phase duration. Basically, the sub-system measures cycle-by-cycle the ON-phase duration and when the measured time becomes shorter than a programmed threshold, the system passes from a slow decay mode to a fast decay mode. The above mentioned programmed threshold may correspond to the blanking time used by the current control system for masking spurious signals caused by power stage transitions.

Figure 12:
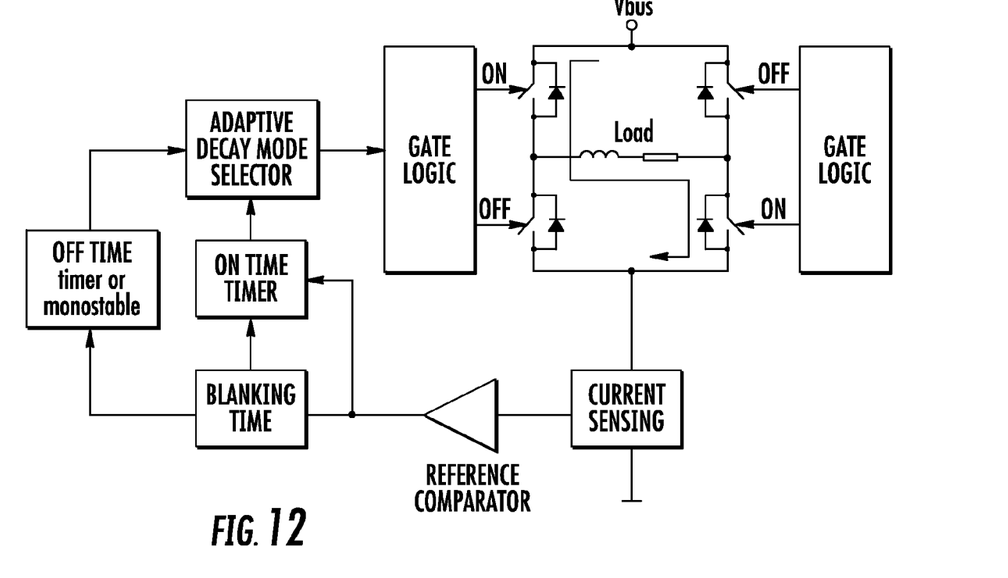
FIG. 12 is a circuit diagram of the functioning of a subsystem of adaptive decay mode selection, according to the present invention.
Figure 13:
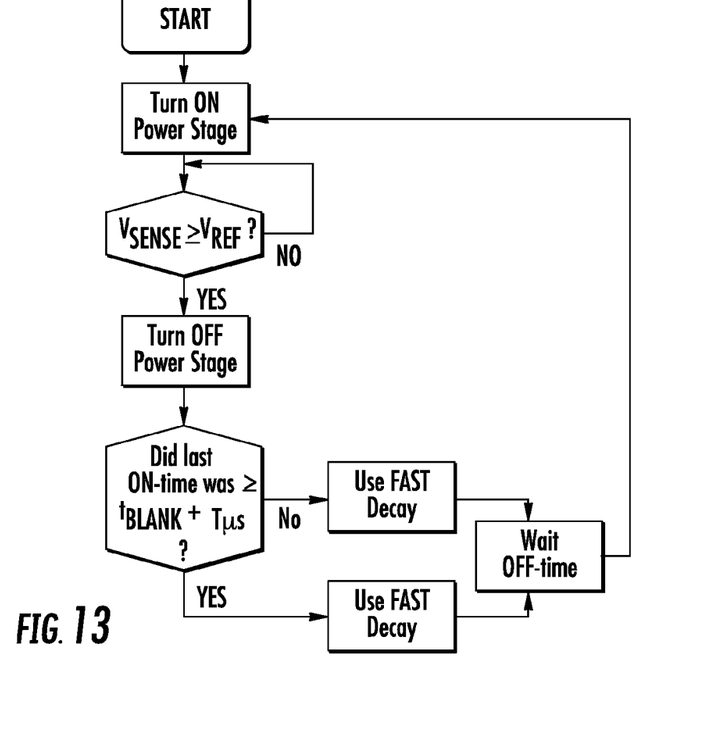
FIG. 13 is a flow chart of the sub-system of adaptive decay mode selection, according to the present invention.
Figure 14:
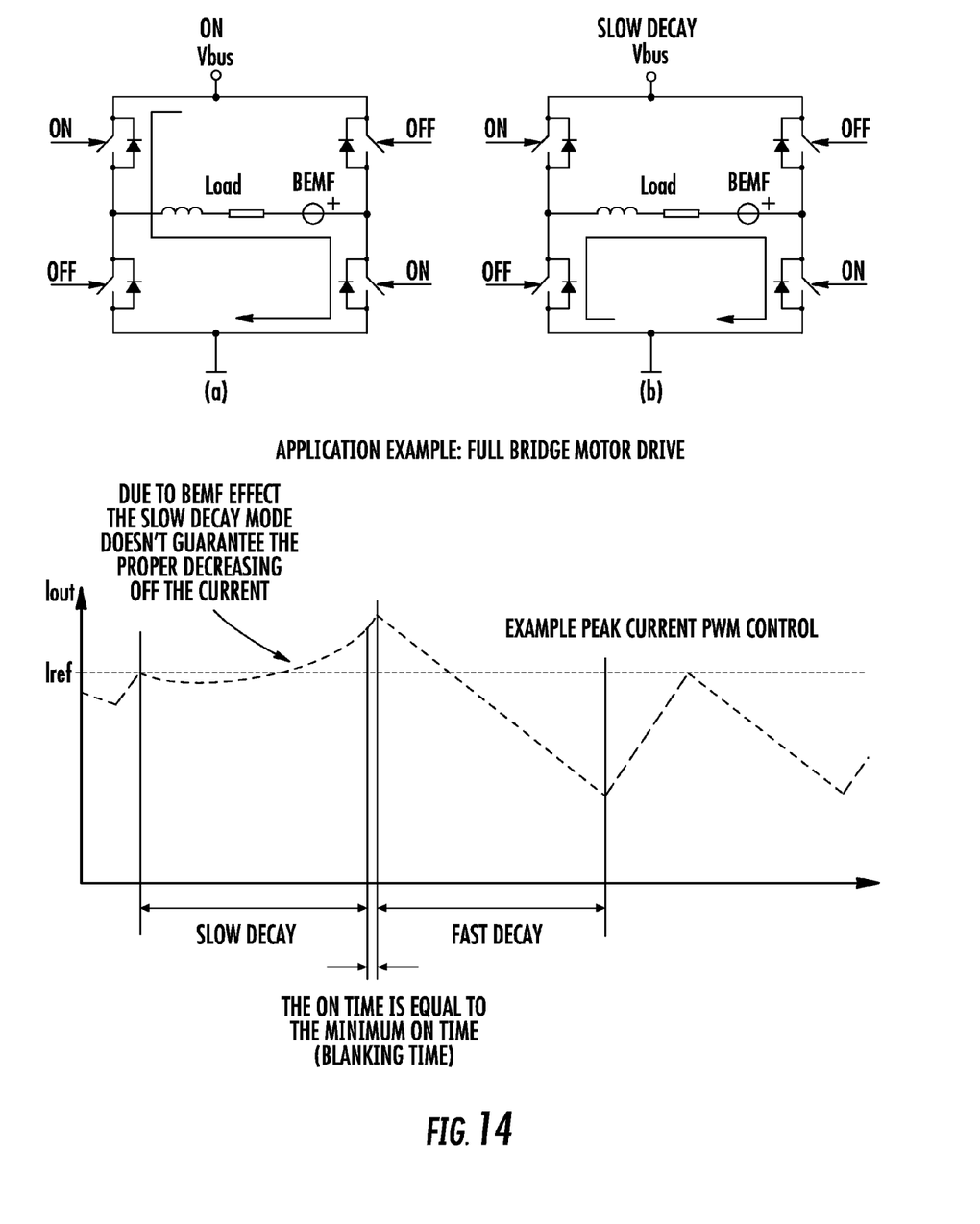
FIG. 14 illustrates an example of adaptive current decay mode selection in a motion control application, according to the present invention.

FIG. 12 and FIG. 13 are an exemplary scheme and flow chart of an embodiment of an ancillary adaptive current decay mode selection sub-system. Apart from being a potential implementation in a current control system of this disclosure with minimum added complexity, an advantage of this new decay mode selection architecture is its suitability for adaptive decay selection. The sub-system retains its high efficiency in most critical applications where the load may not be completely passive, as, for example, in motion control applications. In fact, in these applications, the load cannot be simply equated to an inductor in series with a resistor but a voltage generator representing the back electromotive force (BEMF) source may be considered in series to the load. This is because the rotational energy stored in the motor works as a generator on the load and it is able to alter the current waveform during current decay, as illustrated in FIG. 14.

The decay mode adaptive selection sub-system can be applied to any kind of PWM current control, for example, to a typical peak current control system using fixed OFF time technique or fixed PWM frequency technique.

That which is claimed:

1. A method of current control for driving a load in a pulse-width modulation (PWM) mode through a power stage using a load current sense element and a sense comparator, the power stage alternating ON-phases and OFF-phases, the method comprising:
    setting a comparator threshold corresponding to a reference current value for the load;
    measuring a time interval from an active ON-state of the ON-phase of the power stage to when the load current reaches the reference current value as determined by a switching of the sense comparator; and
    continuing the ON-phase by maintaining the power stage in a predictive ON-state for an additional time interval based upon an average between the measured time interval and the active ON-state time interval measured during a past PWM cycle.

2. The method of claim 1 wherein continuing the ON-phase comprises continuing the ON-phase by maintaining the power stage in the predictive ON-state for the additional time interval equal to the average between the measured time interval and the active ON-state time interval measured during the past PWM cycle.

3. The method of claim 1 wherein after the predictive ON-state, the power stage is set in the OFF-phase for a set time period.

4. The method of claim 1 wherein during a power up operation, the average between the measured time interval and the active ON-state time interval measured during the past PWM cycle is a set default active ON-state time interval.

5. The method of claim 1 wherein the active ON-state time interval measured during the past PWM cycle is based upon at least one of a past PWM cycle directly preceding a current cycle, a past PWM cycle preceding the current cycle, and an ON-state interval time value averaged over a plurality of preceding PWM cycles.

6. The method of claim 1 wherein a blanking period is implemented at each turn-on of the power stage.

7. The method of claim 6 wherein at an end of the blanking period, an output of the sense comparator provides a signal indicative of whether the load current is one of above or below the reference current value; and further comprising:
    if the load current is above the reference current value, the ON-phase is aborted and the power stage is set in an OFF-state; and
    if the load current is below the reference current value, the ON-phase is performed followed by the OFF-phase before turning on again the power stage for a subsequent ON-phase and waiting for an end of the blanking period.

8. The method of claim 1 wherein when the reference current value is modified, active ON-state time measurements are ignored until a next valid switching of the sense comparator and the predictive ON-state time interval retains a last valid calculated value.

9. The method of claim 1 further comprising selecting an adaptive current decay mode for the OFF-phases comprising:
    computing a duration of each ON-phase; and
    comparing the duration with a threshold duration.

10. The method of claim 9 further comprising maintaining a slow decay mode if the duration of the ON-phase is longer than the threshold duration.

11. The method of claim 9 further comprising switching to a fast decay mode if the duration is shorter than the threshold duration.

12. A method of adaptive current decay mode selection in driving a load in a pulse-width modulation (PWM) mode through a power stage using a load current sense element and a sense comparator, the power stage alternating ON-phases and OFF-phases, the method comprising:
    setting a comparator threshold corresponding to a reference current value for the load;
    measuring a time interval from an active ON-state of the ON-phase of the power stage to when the load current reaches the reference current value as determined by a switching of the sense comparator;
    continuing the ON-phase by maintaining the power stage in a predictive ON-state for an additional time interval equal to an average between the measured time interval and the active ON-state time interval measured during a past PWM cycle; and
    selecting an adaptive current decay mode for the OFF-phases comprising
        computing a duration of each ON-phase, and
        comparing the duration with a threshold duration.

13. The method of claim 12 further comprising maintaining a slow decay mode if the duration of the ON-phase is longer than the threshold duration.

14. The method of claim 12 further comprising switching to a fast decay mode if the duration is shorter than the threshold duration.

15. The method of claim 12 wherein after the predictive ON-state, the power stage is set in the OFF-phase for a set time period.

16. The method of claim 12 wherein during a power up operation, the average between the measured time interval and the active ON-state time interval measured during the past PWM cycle is a set default active ON-state time interval.

17. The method of claim 12 wherein the active ON-state time interval measured during the past PWM cycle is based upon at least one of a past PWM cycle directly preceding a current cycle, a past PWM cycle preceding the current cycle, and an ON-state interval time value averaged over a plurality of preceding PWM cycles.

18. A method of adaptive current decay mode selection in driving a load in a pulse-width modulation (PWM) mode through a power stage using a load current sense element and a sense comparator, the power stage alternating ON-phases and OFF-phases, the method comprising:
- setting a comparator threshold corresponding to a reference current value for the load;
- measuring a time interval from an active ON-state of the ON-phase of the power stage to when the load current reaches the reference current value as determined by a switching of the sense comparator;
- continuing the ON-phase by maintaining the power stage in a predictive ON-state for an additional time interval based upon an average between the measured time interval and the active ON-state time interval measured during a past PWM cycle;
- computing a duration of each ON-phase;
- comparing the duration with a threshold duration;
- maintaining a slow decay mode if the duration of the ON-phase is longer than the threshold duration; and
- switching to a fast decay mode if the duration is shorter than the threshold duration.

19. The method of claim 18 wherein continuing the ON-phase comprises continuing the ON-phase by maintaining the power stage in the predictive ON-state for the additional time interval equal to the average between the measured time interval and the active ON-state time interval measured during the past PWM cycle.

20. A current control system for driving a load in a pulse-width modulation (PWM) mode comprising:
- a sense comparator to be configured with a threshold corresponding to a reference current value associated with the load;
- a power stage cooperating with said sense comparator and configured to alternate ON-phases and OFF-phases; and
- a controller configured to
  - measure a time interval from an active ON-state of the ON-phase of said power stage to when the load current reaches the reference current value as determined by a switching of the sense comparator, and
  - continue the ON-phase by maintaining said power stage in a predictive ON-state for an additional time interval based upon an average between the measured time interval and the active ON-state time interval measured during a past PWM cycle.

21. The current control system of claim 20 wherein said controller is further configured to continue the ON-phase by at least continuing the ON-phase by maintaining said power stage in the predictive ON-state for the additional time interval equal to the average between the measured time interval and the active ON-state time interval measured during the past PWM cycle.

22. The current control system of claim 20 wherein after the predictive ON-state, said power stage is set in the OFF-phase for a set time period.

23. The current control system of claim 20 wherein during a power up operation, the average between the measured time interval and the active ON-state time interval measured during the past PWM cycle is a set default active ON-state time interval.

24. The current control system of claim 20 wherein the active ON-state time interval measured during the past PWM cycle is based upon at least one of a past PWM cycle directly preceding a current cycle, a past PWM cycle preceding the current cycle, and an ON-state interval time value averaged over a plurality of preceding PWM cycles.

25. The current control system of claim 20 wherein said controller is further configured to implement a blanking period at each turn-on of said power stage.

* * * * *